A. BOISSIERE.
MOTOR TRACTOR HAVING ENDLESS CHAIN TRACKS.
APPLICATION FILED FEB. 27, 1918.

1,298,444.

Patented Mar. 25, 1919.

INVENTOR
ADOLPHE BOISSIÈRE
BY
ATTORNEYS

UNITED STATES PATENT OFFICE.

ADOLPHE BOISSIÈRE, OF PARIS, FRANCE.

MOTOR-TRACTOR HAVING ENDLESS-CHAIN TRACKS.

1,298,444.     Specification of Letters Patent.     Patented Mar. 25, 1919.

Application filed February 27, 1918. Serial No. 219,499.

*To all whom it may concern:*

Be it known that I, ADOLPHE BOISSIÈRE, a citizen of the Republic of France, and a resident of 109 Avenue Henri Martin, Paris, France, have invented new and useful Improvements in Motor-Tractors Having Endless-Chain Tracks, of which the following is a specification.

This invention relates to a motor tractor having an endless chain track passing over three wheels (of which one wheel is a driving wheel) in an approximately triangular path, adapted to be caused at will to rest upon the ground with its longest base (operative position) or to be raised off the ground on both sides of the shaft of the wheel that drives or supports the central portion of the endless chain track (for transportation on roads, for maneuvers, etc.).

The accompanying drawings illustrate by way of example an embodiment of this invention.

Figure 1:
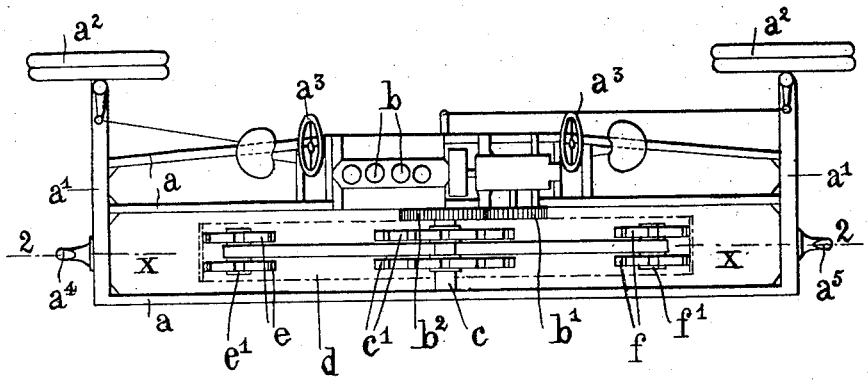
Figure 1 is a plan.
Figure 2:
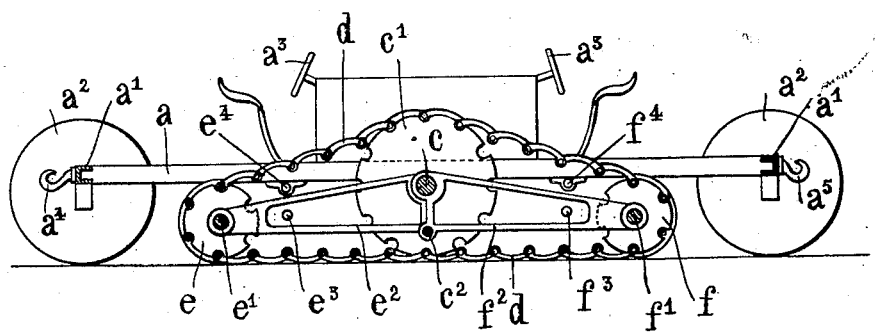
Fig. 2 is a vertical section on the line 2—2 of Fig. 1.

The tractor comprises a rectangular carriage framing with longitudinals $a$. The end stays $a^1$ of this framing are extended externally on the same side for the purpose of receiving the two steering wheels $a^2$ which are located one behind the other parallel to the general axis $x\ x$ of the tractor, and which are operated by means of one or the other of the hand wheels $a^3$ according to the direction of travel of the tractor.

The motor $b$ drives through a clutch mechanism a change speed gear with reversing mechanism and a pinion $b^1$ engaging with a toothed wheel $b^2$, the shaft $c$ which is located in the central transverse plane of the tractor and upon which shaft the driving wheel is fixed that actuates the endless chain $d$. This driving wheel is composed of two pinions $c^1$, $c^1$, mounted parallel to each other on the shaft $c$ and over which the endless chain track passes. This endless chain track $d$ is composed of inwardly curved plates having a radius of curvature equal to that of the pinions $c^1$. These plates are interchangeable and are movably jointed to one another. The chain $d$ is supported at each end of its path on a pair of free guide wheels $e$ and $f$ respectively, whose axles $e^1$ and $f^1$ are journaled at opposite apices of two triangular frames which are similar to each other and are arranged symmetrically, and are connected at their short sides and journaled on the shaft $c$ of the driving wheel of the endless chain. The triangle $c^1\ e\ f$ (path of the chain) is rendered indeformable by keying at $c^2$ the two triangular frames $e^2$ and $f^2$ which are capable of rocking about the shaft $c$. These two triangles, connected in this manner at their short bases, constitute in their turn a trussed girder of isosceles triangular shape which serves to keep the endless chain stretched and has its longer base located nearest to the ground. In its operative position the endless chain comes into contact with the ground parallelly to the said longer base.

The employment of an endless chain track allows of distributing the weight over a maximum area of ground, thereby increasing the adhesion to the ground while avoiding the compression and subsidence of the ground.

For transportation on roads, for maneuvers, etc., the endless chain $d$ is raised at the two ends of its path on both sides of its driving wheel. For the purpose of effecting this raising, it is merely necessary to move the two short bases of the two triangular frames $e^2$ and $f^2$ away from each other by causing them to rotate about their pivotal axle $c$, after having disconnected them from each other by removing the key or bolt at $c^2$. As the triangle $c^1\ e\ f$ becomes deformed thereby the chain $d$ will remain in contact with the ground only with its bottom stretch where it rolls over the driving wheel.

This raising of the endless chain may be effected in any suitable manner, for instance by hand, by moving apart the two short bases of the two frames $e^2$ and $f^2$ by means of a lifting jack, or by a simple, direct raising of the guide wheels $e$ and $f$. It may be effected automatically by means of two struts pivoted on the axles $e^1$ and $f^1$ of the guide wheels, by causing the tractor to move forward on said struts. In such a case a movement of the tractor for a few meters in either direction will cause a raising of the frames $e^2$ and $f^2$ and consequently their automatic engagement at $e^3$ and $f^3$ with points $e^4$ and $f^4$ of the tractor carriage framing.

The position of the parts for normal traveling may be reëstablished by simple disengagement at the said points.

The improved tractor is more particularly designed for agricultural work but it may also be used for any other traction purposes on loose ground.

The agricultural implement or other trailer is coupled according to the direction of travel at $a^4$ or $a^5$, that is to say, exactly in the axis of the tractive force.

What I claim is:—

1. A motor tractor having an endless chain track passing over three wheels (of which one wheel is a driving wheel) in an approximately triangular path, and means for causing at will said endless chain to rest on the ground with its longer base or to be raised on both sides of the shaft of the wheel that drives or supports the middle portion of the endless chain track.

2. A motor tractor having an endless chain track passing over three wheels (of which one wheel is a driving wheel) in an approximately triangular path, and means for causing at will said endless chain to rest on the ground with its longer base or to be raised on both sides of the shaft of the wheel that drives or supports the middle portion of the endless chain track, said means consisting of two triangular frames which are similar to each other and are symmetrically arranged, and are connected to each other at their shorter bases and are provided at their opposite apices with guide wheels supporting the endless chain track, these two frames being journaled on the shaft of the driving wheel of the endless chain in such a manner that they can rock on said shaft for the purpose of raising the said chain.

In testimony whereof I have signed my name to this specification, in the presence of two subscribing witnesses.

ADOLPHE BOISSIÈRE.

Witnesses:
CHARLES DORNY,
M. DEFÈSERIMONT.